Sheet 1 – 3 Sheets.

H. A. Wells.

Forming Bals.

No 400

Reissued Oct 7, 1856.

H. A. Wells.

Forming Bats.

Reissued Oct. 7, 1856

No. 400

H. A. Wells.
Forming Bats.
No. 400 Reissued Oct. 7, 1856.
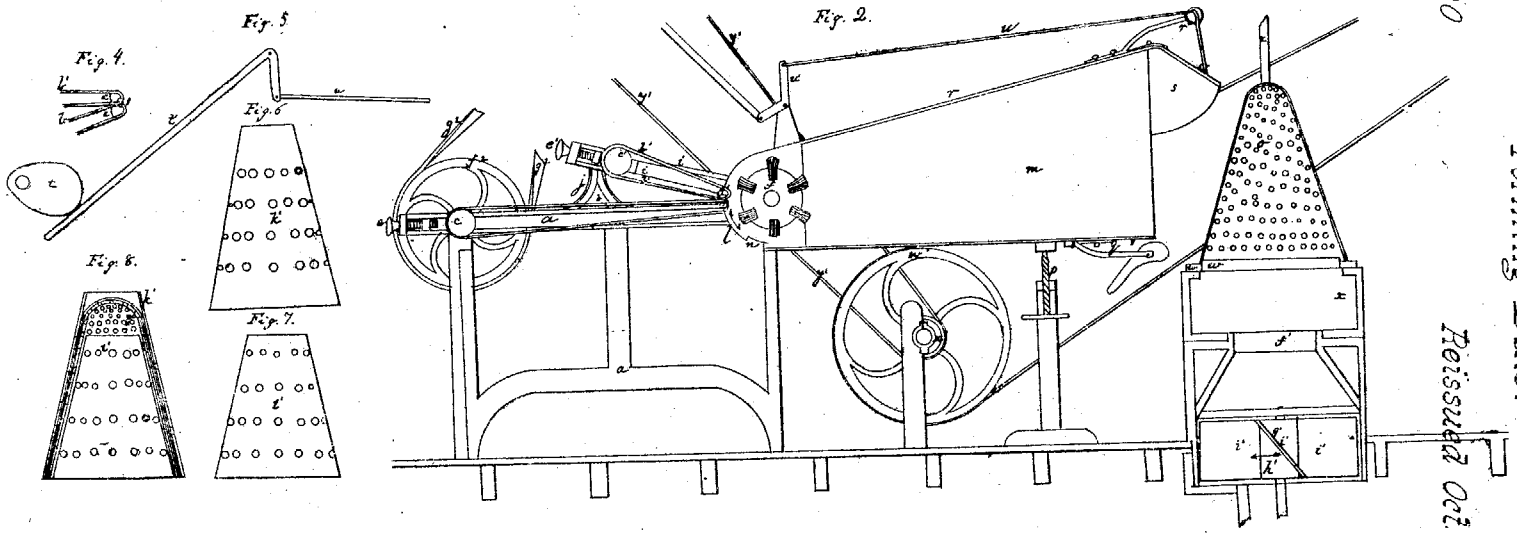

UNITED STATES PATENT OFFICE.

CHARLES ST. JOHN, HENRY A. BURR, ALBERT H. WRIGHT, AND JAMES M. RIBLET, OF NEW YORK, N. Y., ASSIGNEES OF HENRY A. WELLS, DECEASED.

IMPROVEMENT IN MANUFACTURING HAT-BODIES.

Specification forming part of Letters Patent No. 4,472, dated April 25, 1846; Reissue No. 460, dated October 7, 1856.

*To all whom it may concern:*

Be it known that HENRY A. WELLS, late of the city, county, and State of New York, now deceased, did in his life-time invent certain new and useful Improvements in the Process of and Machinery for Making Hat-Bodies of Fur, (for which said improvements Letters Patent of the United States were granted to the said WELLS, bearing date the 25th day of April, 1846,) of which the following is a full, clear, and exact description of the principle or character which distinguishes the said invention from all other things before known, and of the manner of making, constructing, and using the same, reference being had to the accompanying drawings, making part of this description, in which—

Figure 1:
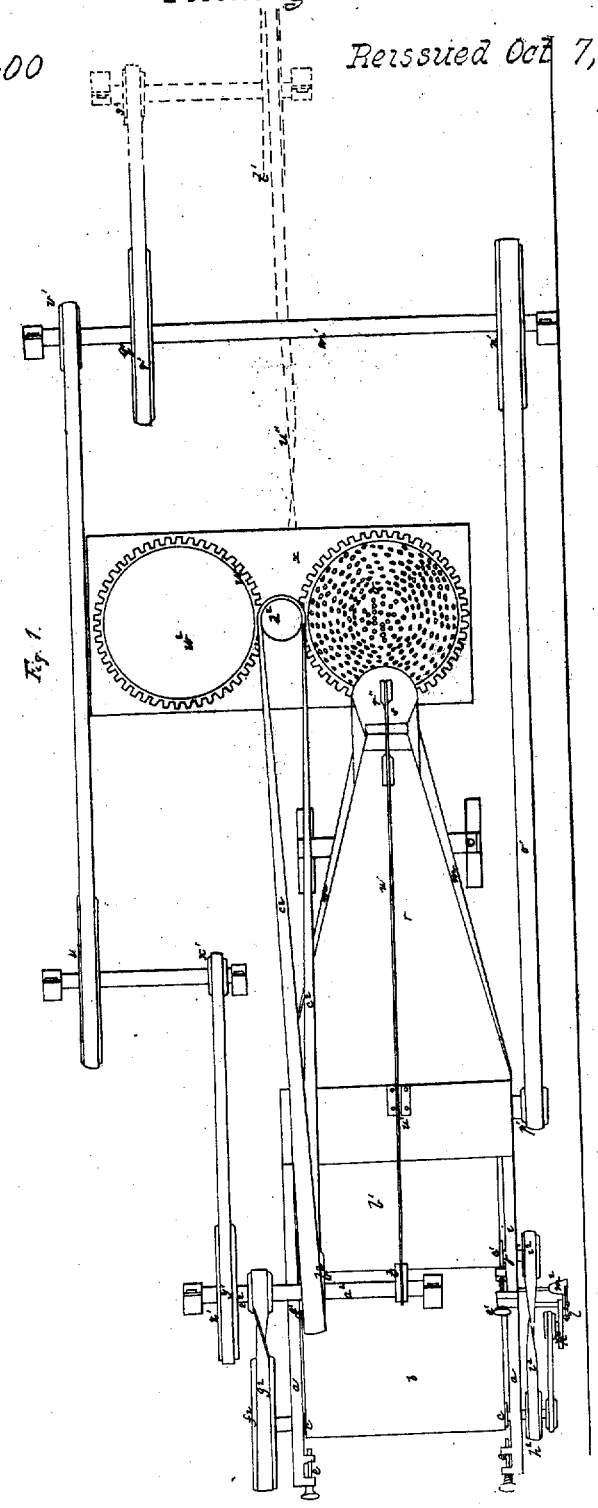
Figure 3:
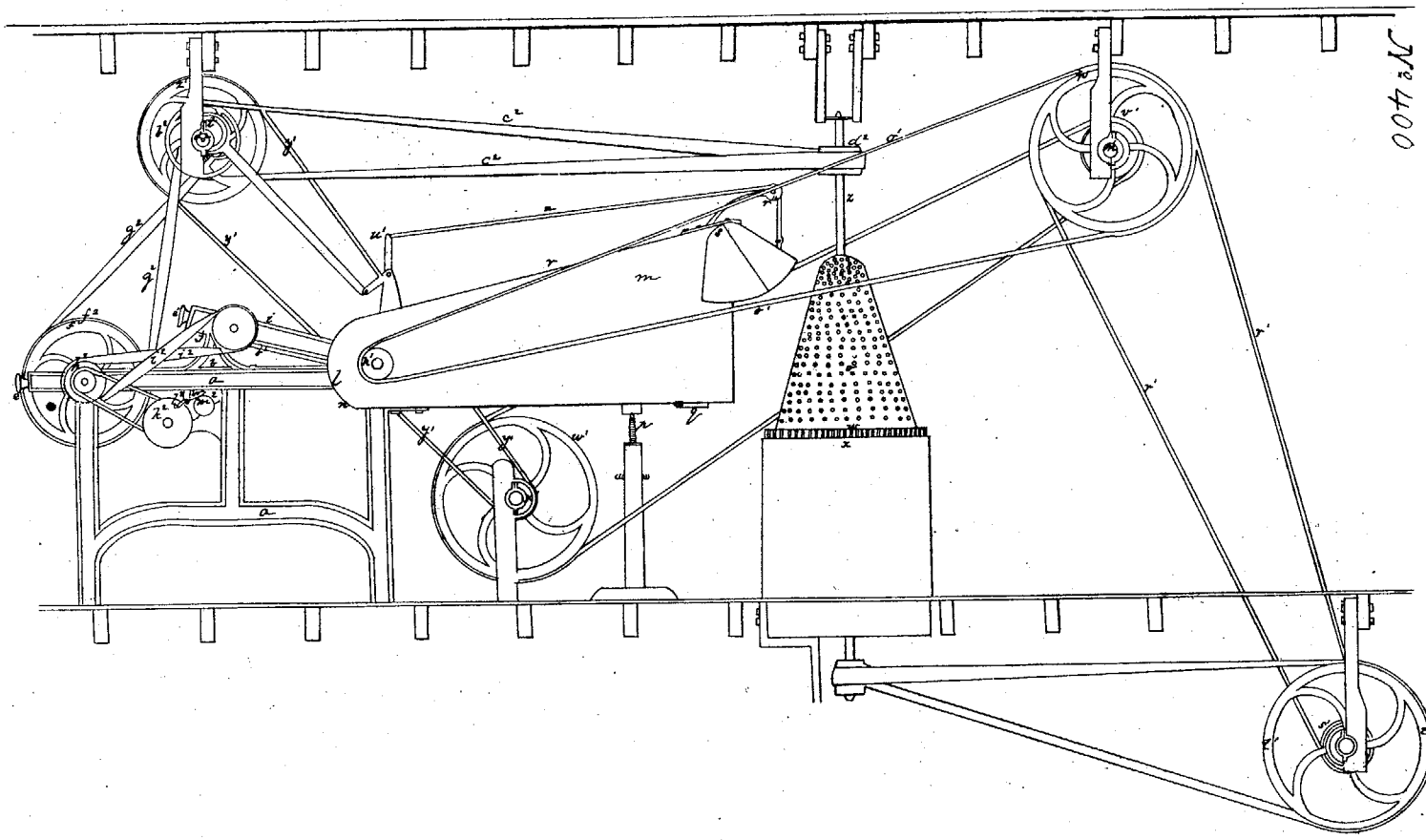

Figure 1 is a plan of the machine; Fig. 2, a longitudinal vertical section, and Fig. 3 a longitudinal elevation.

The other figures will be described in their appropriate places.

The same letters indicate like parts in all the figures.

It has long been tried to make hat-bodies by throwing the fibers of fur, wool, &c., by a brush or picker-cylinder onto a perforated cone, exhausted by a fan below, to carry and hold the fibers thereon by the currents of air that rush from all directions toward and through the apertures of the cone, and thus form a bat of fibers ready for hardening and felting; but from various causes all these attempts have failed.

Hat-bodies are required to be made thick at and near the rim, and thin along the crown and tip, that the required strength may be given where it is required without making the hat too heavy and at too great a cost of material. This disposition of the fur can be obtained by the skill and judgment of the workman by the hand process known under the name of "bowing," but cannot by the plan above referred to, for the reason that the fibers are only controlled by the currents induced through the apertures of the cone or other form by the exhaust, instead of being thrown and properly directed for distribution onto the cone or other form. When the fibers are not properly thrown and directed, but are drawn to the surface by the action of the exhaust, the force thus induced gradually decreases as the apertures in the cone are closed up by the accumulation of the fur deposited on the outer surface thereof, and in consequence the impelling force which carries the fibers becomes insufficient to control the force of gravity, which will then prevail and cause the fibers to accumulate to a greater thickness on the tip of the cone, where much less is required, than below; and the said suggested plan cannot produce a practical result, for the further reason that there is no mode described by which the bat of fur fibers can be hardened while on the cone that it may be removed from such cone preparatory to the after and well-known process of sizing or felting.

The invention of the said HENRY A. WELLS, by which the required practical result was obtained, consists in forming the bat of fur fibers on a perforated cone or other form, in the manner substantially as above described, in combination with the hardening of such bat while on such cone or other form, to give it the required consistency to admit of taking it off in a suitable condition for sizing by the well known process of felting.

In the accompanying drawings, *a* is a frame properly adapted to the operative parts of the machine, and *b* the lower feed-apron, on which the stock is spread by the attendant in separate parcels, each sufficient for the formation of a hat according to its intended weight. This apron or endless belt of cloth or other suitable material passes around a roller, *c*, and a lip, *d*, the former at the back of the machine, with its bearings in sliding boxes governed by set-screws *e e*, for the purpose of tightening the apron, and the latter near to the rotating brush *f*, and so formed as to present a slightly-rounded edge for the apron to pass over where it presents the fur to the action of the brush. Instead of this slightly-rounded edge, a small metallic roller may be substituted; but when this is done the roller should be supported at different points between its end journals, and this he effected by letting it run in a circular groove in the lip, as represented in section at Fig. 4, where $g$ indicates this roller. The fur, as it is carried along toward the lip $d$, is gradually compressed by the upper apron, $b'$, which passes around a feed-roller, $c'$, and lip $d'$ in manner similar to the under feed-apron. The roller $c'$ runs in a frame, $i$, (of which the lip $d'$ forms part,) hung on journals that rest in standards $j$, so that the lip $d'$ can be made to press onto the fur between it and the under lip, $d$, and thus grip the fibers and present them to the effective action of the brush $f$. The under plane of the upper apron, $b'$, is inclined to the upper plane of the lower one, $b$, the more effectually to present the fibers in the proper manner to the brush. The roller $c'$ of the upper apron runs in sliding boxes govered by set-screws $e'$ $e'$, and is placed forward of the journals of the frame, so that the tension of the belt $i^2$, which communicates motion from the lower roller, $c$, to the upper one, $c'$, may press the upper lip, $d'$, on the under lip, $d$; but this may be effected by means of springs, weights, or other well-known mechanical devices for making pressure under similar circumstances. The fibers, as they pass from the feed-aprons, are acted upon by a brush, $f$, that rotates with great velocity, and which is composed of parallel rows of stiff bristles projecting from a cylinder, but which may be differently constructed and composed, if desired. As the fibers are first presented, they are brushed and properly laid by the downward action of the brush, as indicated by the arrow, and when liberated are carried down the curved surface $l$ of a chamber or tunnel, $m$, and at the lower edge of this they meet a current of air, (that enters a narrow aperture, $n$, near the bottom of the chamber, and extending the whole length of the brush,) which, being induced by the rotation of the brush and the partial vacuum in a perforated cone, prevents the fibers of fur from falling and resting on the bottom of the chamber, and carries them onto the perforated cone $o$. This chamber extends over and under the brush and the forward part of the lips, and turns on the journals of the brush, or is otherwise so arranged as to have a slight motion the axis of which is the same as that of the brush. Its bottom rests on a set-screw, $p$, to regulate the delivery end of the chamber relatively to the cone. Its forward end, in addition to this, is provided with a hinged flap, $q$, regulated by a cam-lever, as a means of regulating the delivery of the fibers. Its top $r$ is gradually elevated and sides contracted to make the delivery-aperture nearly of the form of the cone, but narrower and higher, and its upper part is provided with hood, $s$, so curved as to correspond generally with the curve of the tip of the cone. This hood is hinged to the upper part of the delivery-aperture of the chamber, and is connected with an eccentric, $t$, by means of a cord, $u$, and bell-crank $u'$, that passes over a pulley, $r''$, so that each revolution of this eccentric carries the hood up and down to direct the discharge and distribute the fibers onto the cone, a greater thickness being desirable in the parts of the bat which forms the brim than on the tip and crown, and when it is desired still further to diversify the distribution of the fibers a cam can be substituted for the eccentric, and the connection between it and the hood is formed, as represented in section at Fig. 5, where the cam $t$ acts on a lever, $t'$, connected with the hood $s$ by the cord $u$. The cone $o$ is made in the usual manner, but of thin sheet metal perforated, instead of wire-gauze. Its lower edge fits in a metallic ring, $w$, that runs in an appropriate collar in the upper part of a case, $x$, and its outer periphery is provided with cogs that mesh into the cogs of a pinion, $y$, (concealed in the drawings by the pulley $d^2$,) on a vertical shaft, $z$, by which a slow rotary motion is given to the cone, as the fibers are thrown onto it, to distribute them equally all around the cone. The case $x$ is sufficiently long to receive two rings, $w$, one on each side of the pinion $y$, by which both are kept in motion, and it (the case) is made to swivel on a hollow collar, $f'$, to which its bottom is fitted, so that when one cone is covered it may be turned aside by turning the case half a revolution, and another cone put onto the other ring that another bat may be in the process of forming, while the one already formed may be prepared for the hardening process, in the manner to be hereinafter described. The case $x$ communicates through the hollow collar $f'$, with an exhausting fan-blower, $g'$, which consists of a vertical arbor, $h'$, with oblique vanes $i'$, so that when rotating with great velocity in the direction of the arrow, the air is exhausted from the case $x$ and the perforated cone $o$. When one of the cones is removed from one of the rings $w$ to be taken to the hardening apparatus, the aperture in the ring $w$ must be closed up with a cap-plate, $w^2$, to prevent the access of air. Any other mode of exhausting the case and cone may be employed; but this is the most efficient, which he (WELLS) essayed.

The preparation of the formed bat for hardening is effected by covering it with pieces of felt or fulled cloth just taken from hot water, and this is done in the following manner, viz: The attendant takes from a kettle of hot water a piece of felt cloth rolled upon a roller, and applies one end of it to the surface of the bat, and as the cone rotates the felt cloth winds from the roller onto the bat on the cone. Another piece of felt cloth is put on the top, and then a strong perforated metallic cone, $k$, (see Fig. 6,) is put over the whole, the more effectually to hold the fibers of the bat, and to make a slight pressure on them while it is immersed in hot water to harden. As the perforated cone $o$ is better when made very thin, the pressure of the water, when drawing it out of the kettle, after the bat has been hardened, tends to and would collapse it, and therefore, to prevent this, another perforated metallic cone, $l'$, (see Fig. 7,) is put inside (before the whole is immersed in hot water) to sustain the pressure in drawing the whole out of the hardening-kettle. The relative situation of the three cones, the bat, and the covering felt cloth preparatory to the hardening process is represented on an enlarged scale at Fig. 8, which is a vertical section through the whole. The inner sustaining-cone may be dispensed with, if desired, by making the cone *o* of greater thickness and strength.

All the operative parts may be set in motion by any of the known means—such as belts—as fully represented in accompanying drawings, in which $m'$ is a main-line shaft overhead, driven by any first mover. From a wheel, $n'$, on it a band, $o'$, extends to a pulley, $p'$, on the shaft of the brush, which should make about two thousand revolutions per minute, more or less. From another wheel, $q'$, on this same shaft a band, $r'$, extends to a pulley, $s'$, on the shaft of which there is a wheel, $t'$, that drives the exhaust-fan $g'$ by the belt $u''$, and from a pulley, $v'$, on the same line-shaft a belt extends to a wheel, $w'$, on the shaft of which there is a pulley, $x'$, from which extends another belt, $y'$, to a wheel, $z'$, on the shaft $a^2$ (that carries the eccentric $t$) to give all the reduced motions required for the other parts of the machinery. From a wheel, $b^2$, on this shaft a belt, $c^3$, extends to a pulley, $d^2$, on the shaft $z$, that rotates the cone $o$, and another pulley, $e^2$, drives the wheel $f^2$ of the feed-roller $c$ by the belt $g^2$, and on the other end of the axle of this feed-roller there is a pulley, $h^2$, which drives by a cross-belt, $i^2$, the upper feed-roller, $c'$. If desired, an alarm can be connected with the feed-roller of the lower apron to announce to the attendant when each charge of stock is exhausted, that the cones may be shifted. This can be done by connecting the arbor of the feed-roller $c$ of the lower feed-apron by a belt with a wheel, $k^2$, provided with a cam or pin to lift at every revolution the hammer $l^2$ of a bell, $m^2$, the striking of which shall give requisite indication.

It will be obvious from the foregoing that the hood may be operated by hand instead of machinery, thus substituting the attention, skill, and cost of an operative for the positive regularity and cheapness of mechanical movements.

It may be well to add, as a mere matter of precaution, that this invention is not limited to the making of hat-bodies, but to the making of bats on formers of any other shape or configuration, the form of the delivery-aperture of the chamber, and the hood and the movements of the latter being properly-adapted to the change of form of the perforated mold or former with the restrictions indicated.

Having thus described the mode of application of the said invention of the said HENRY A. WELLS, as the same was successfully reduced to practice by him, we do not wish to be understood as limiting the claim of invention to such mode of application, as other modes may be devised, operating on the same principle, or having the same mode of operation, and only differing therefrom in the substitution of equivalent means.

What we claim as the invention of the said HENRY A. WELLS, deceased, in the process of making fur hat-bodies, is—

The forming of the bat of fur fibers on a perforated cone or other form, in manner substantially as described, in combination with the hardening of such bat while on such cone or other form, to give it the required consistency to admit of taking it off in a suitable condition for sizing by the well-known process of felting, substantially as described.

CHARLES ST. JOHN.
H. A. BURR.
A. H. WRIGHT.
JAS. M. RIBLET.

Witnesses:
WM. H. BISHOP,
ALEX. PORTER BROWN.